(12) United States Patent
Dearborn

(10) Patent No.: US 8,250,056 B2
(45) Date of Patent: Aug. 21, 2012

(54) WEB-BASED DECISION MATRIX DISPLAY

(76) Inventor: John S. Dearborn, Davis, CA (US)

( * ) Notice: Subject to any disclaimer, the term of this patent is extended or adjusted under 35 U.S.C. 154(b) by 90 days.

(21) Appl. No.: 12/580,153

(22) Filed: Oct. 15, 2009

(65) Prior Publication Data

US 2011/0093446 A1   Apr. 21, 2011

(51) Int. Cl.
*G06F 17/30* (2006.01)

(52) U.S. Cl. ............................ 707/706; 707/722

(58) Field of Classification Search .............. 707/706, 707/722

See application file for complete search history.

(56) References Cited

U.S. PATENT DOCUMENTS

| | | | |
|---|---|---|---|
| 6,826,552 B1 | 11/2004 | Grosser et al. | |
| 2001/0014893 A1* | 8/2001 | Boothby | 707/201 |
| 2001/0023414 A1 | 9/2001 | Kumar et al. | |
| 2002/0169764 A1* | 11/2002 | Kincaid et al. | 707/3 |
| 2003/0182174 A1* | 9/2003 | Kalish et al. | 705/10 |
| 2010/0312788 A1* | 12/2010 | Bailey | 707/769 |

FOREIGN PATENT DOCUMENTS

WO   2007099539 A2   9/2007

OTHER PUBLICATIONS

Website printout: http://www.bankrate.com, 4 pages.
Website printout: http://www.cgi.money.cnn.com, 6 pages.
Website printout: http://www.eloan.com, 15 pages.
Website printout: http://www.nelnet.com, 3 pages.
Website printout: http://www.yahoo.com/dir, 3 pages.
Website printout: http://www.colleges.usnews.rankingandreviews.com/usnews/edu/college/rankings/brief/t1libartco_brief.ph, 5 pages.

* cited by examiner

*Primary Examiner* — Hosain Alam
*Assistant Examiner* — Johnese Johnson
(74) *Attorney, Agent, or Firm* — Schneck & Schneck; Thomas Schneck

(57) ABSTRACT

A tool, using an expressly programmed computer which is programmed with executable instructions, that utilizes data mined from web queries to populate a decision matrix for finding an outcome to a query. The decision matrix is a displayed spreadsheet having rows representing fields that are typical for the query. The web yields data that is extracted and stored in the fields for a plurality of such sites. Calculators or operator methods are used for displaying a desired outcome using the fields. The field data may be entered manually when not found on websites. Data may be changed from actual data to represent hypothetical situation or a data field may be deleted. Columnar data is operated upon to determine different outcomes for comparison.

14 Claims, 5 Drawing Sheets

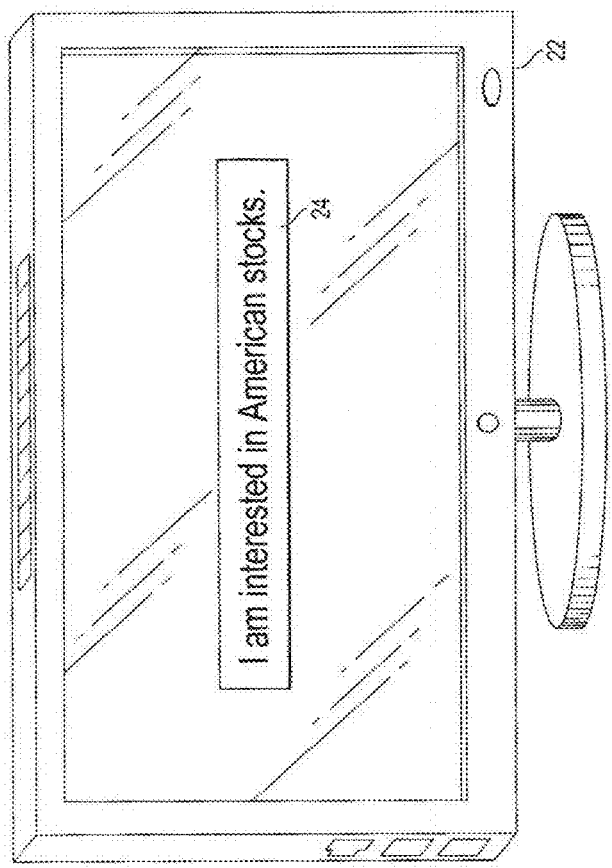

WEB-BASED DECISION MATRIX DISPLAY

TECHNICAL FIELD

The invention relates to data retrieval and, more particularly, to a tool for modeling data using web data.

BACKGROUND OF THE INVENTION

Search engines have tools known as spiders or web crawlers that visit World Wide Web pages to extract information determined by policies of the search engine. The information that is extracted responds to queries from users, usually in the form of by words or phrases. The information that is retrieved is from web pages having genuine factual and numeric data, as well as news, advertising, gossip, images, opinion and other items. Other web pages include calculators for using web information to compute answers to problems. An object of the invention is to extract factual and numeric data from comparable sources for decision making that allows interactive hypothetical changes to the data.

SUMMARY OF INVENTION

The invention is a software tool which utilizes an expressly programmed computer. The expressly programmed computer is programmed with executable instructions specifically designed to perform the various steps and processes of the invention. The tool uses a web search engine to find websites having mineable data pertinent to a data query having an outcome requested by a user. The search engine performs a web search for websites relating to the data query. The tool selects a pre-determined number of relevant sites located by the search engine and extracts, and stores field data or parameters relevant to the query in data fields. The tool also stores operators and calculators which are specific to the queries. The calculators apply the operators to the field data which are relevant to the query and also on the requested outcome. The stored operators and calculators may be arithmetic or logical in nature.

The web, as describe herein, may be the Internet, an internet as a large network made up of smaller networks, an extranet, an intranet, or an enterprise network. Anything web-based would correspond to the various types of the web as just described. For example, a website would be a site and a web page would be a page on any of the types of web as defined above.

The tool constructs a decision matrix by plotting data fields versus data with actual field data populating cells in the decision matrix. The tool implements and uses a model calculator, based on the stored operators, to determine the requested outcome per the field data in the cells. The requested outcome, as is the field data, is displayed in its own cell along with the field data cells on the decision matrix. A displayed outcome responds to interactive manipulation of the field data in the cells. Changing the field data in cells produces corresponding changes in the displayed outcome. Conversely, the displayed outcome may be interactively changed and the field data in the cells is correspondingly changed. Note that a cell of the decision matrix may be populated with a single item of field data or outcome or multiple items of field data or outcomes.

The calculators determine the desired outcome when sufficient field data is present in the cells. In addition, the calculators may determine what field data is presented in the cells when the desired outcome is interactively entered or changed.

The displayed outcome and the field data in the cells appear together on the decision matrix. There is no need to change displays or matrices to view the corresponding results of manipulating the cells or outcome on the decision matrix.

In a simple example, a user interested in a car loan could request from the tool a "monthly auto loan payment." The tool would parse the request, identify relevant data fields pertaining to the request, and relevant stored operators which are pertinent to computing the outcome. The tool would communicate the relevant data fields to the search engine. The search engine would use the relevant data fields and identify auto loan websites. A first type of website of interest could be loan agencies offering auto loans with mineable data such as terms of loan, interest rate or rates, and down payment or trade-in amount. These are relevant data are stored by the tool as field data in appropriate data fields. The tool would also provide the relevant operators to the decision matrix thus enabling the calculators to determine the outcome.

A decision matrix, which may be rectangular like a spreadsheet, is displayed to the user. The decision matrix is populated with the relevant data fields, field data, etc. If the user does not want a comparative analysis from different websites or sources, the decision matrix would have columns representing select data fields and rows which represent entry of different versions of the query. The field data in the data fields may be from more than one website or source. If the user wants a comparative analysis from different websites or sources for computing an outcome, a site comparative analysis decision matrix is constructed. An example of a site comparative analysis decision matrix may be for a monthly loan payment where the rows may be used to represent the selected data fields and the columns used to represent the different loan sources.

Cells of the decision matrix are populated with field data from the various sites and with the outcome. The cells may be manipulated interactively. Where needed field data is missing, it may be entered manually into the cells. A calculation operation, performed by the calculators, is used to produce an "outcome," representing the monthly auto loan payment which is displayed along with the selected data fields. A user is allowed to interactively vary field data in the cells to test hypothetical outcomes and see the outcomes displayed on the same decision matrix. For example, what would happen to the monthly auto loan payment if interest rates change by one point, by two points, increasing and decreasing? A person can then select an appropriate loan source by using cells in a different row from a different source. A user may also vary an outcome and see how that may change the field data in the cells. This all occurs on the same decision matrix.

Executable instructions for the expressly programmed computer may also be designed to carry out various system policies. One such system policy would enable a user to vary an outcome and see the resulting changes in the field data in the cells. The system policies would designate which cells remain constant, which cells may change to reflect the change in the outcome, and how the changes would be made by the calculators.

The decision matrix allows a user to see the selected data fields, the changes to the data fields with the resulting outcome, or changes to the outcome with the resulting changes to the data fields on the same display. There is no need to alternate between a display that allows manipulation of the selected data fields and a display that presents the outcome.

BRIEF DESCRIPTION OF THE DRAWINGS

FIG. 3 is a plan view of an input screen for a query following the diagram of FIG. 1B.

FIG. 4 is a plan view of a decision matrix, a non site comparative decision matrix using field data from one or more sites to determine an outcome.

DESCRIPTION OF INVENTION

Figure 1A:
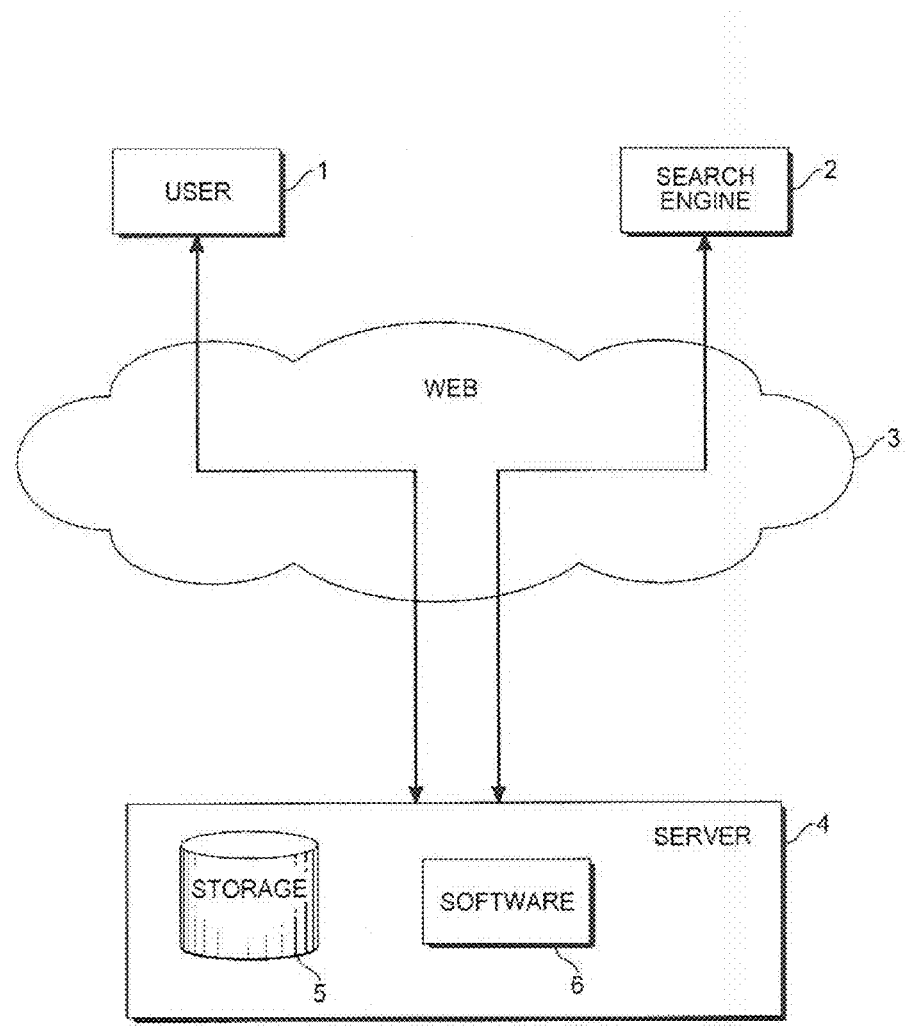
FIG. 1A is a diagram showing an overall view of the various interacting components used by the method.

FIG. 1A illustrates the overall view of the interacting components of the method. The major components are a user 1, a search engine 2, a web 3, and a server 4. The user 1 may access the server 4 via the web 3. The user 1 would use a computing device (not shown) which enables communication between the user 1 and the server. The computing device would have a display device such as a monitor which allows display of and interaction with graphical displays and information from server 4.

The search engine 2 may be any search engine available on the web 3. The search engine 2 may communicate with the server 4 and with the web 3. The web 3 may be may be the Internet, an internet as a large network made up of smaller networks, an extranet, an intranet, or an enterprise network.

The server 4 has, among other things, storage 5 and software 6. The server 4 controls and operates the method with software 6, which has executable instructions specifically designed to perform the various processes and steps of the method. Storage 5 is a computer readable storage medium on which the server maintains the various data, operators, calculators, etc. needed to conduct the method. Various embodiments may include a plurality of servers, software, and storage.

Figure 1B:
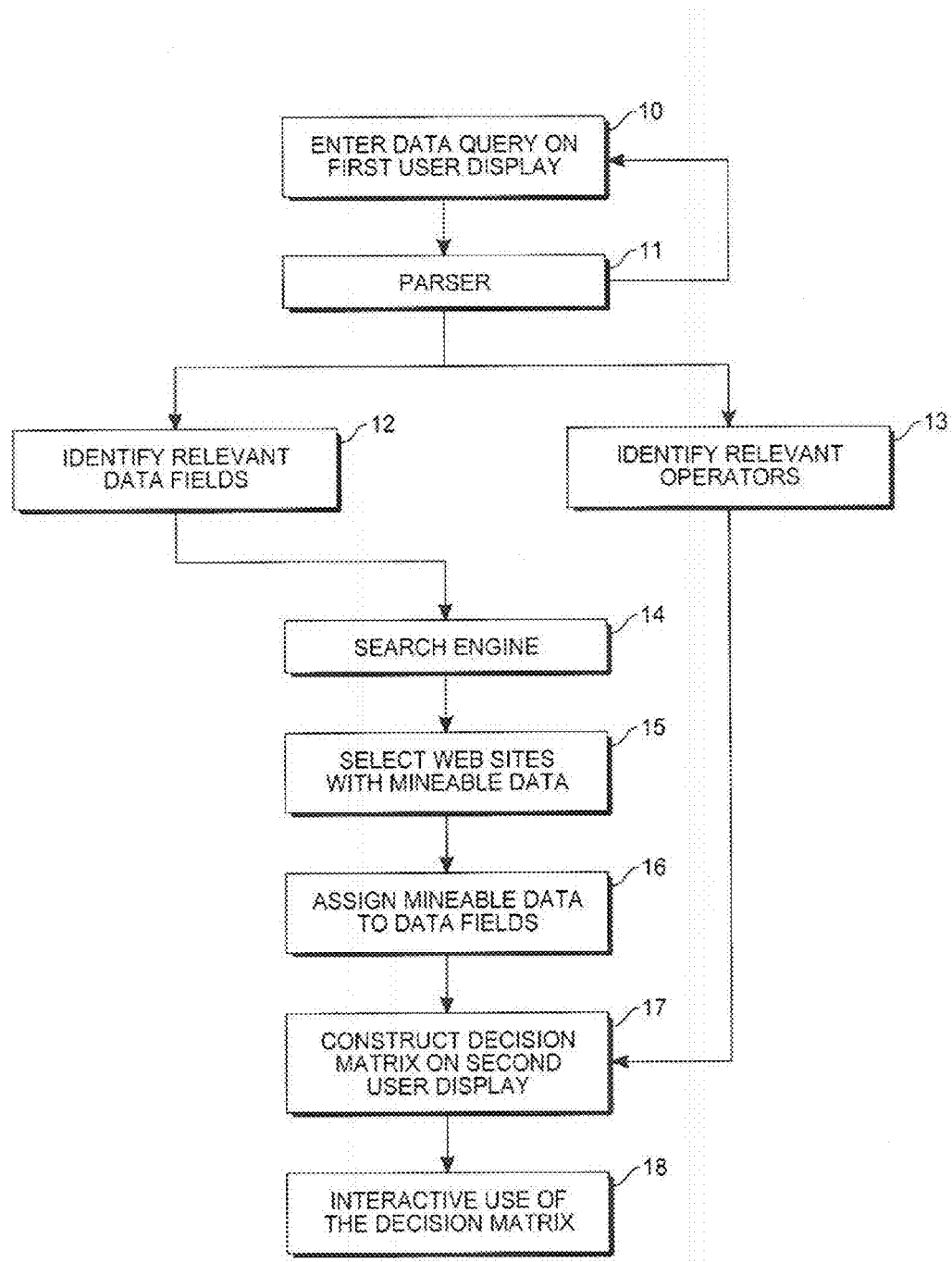
FIG. 1B is a diagram showing a general depiction of the steps of the method.

With reference to FIG. 1B, block 10 represents user 1 of FIG. 1A entering a data query into a first user display. The first user display is a graphical representation appearing on the display device with which the user 1 may interact. The parser 11 analyzes and parses the query to determine the requested outcome, relevant data fields and relevant operators. The parser 11 in block 12 identifies relevant data fields and in block 13 relevant operators all of which are pertinent to computing the desired outcome to the query. The parser 11 may select a keyword or appropriate parameter, as an outcome and user 1 of FIG. 1A may be queried to confirm the desired outcome term or idea. If the parser 11 cannot identify the relevant data fields or operators or cannot identify an outcome, the parser 11 returns an appropriate message on the first user display 10. In addition, if the parser cannot identify the outcome then system policies may be instituted to determine data fields, operators, calculators, etc. for this outcome. Thus, allowing expansion of the queries and outcomes that can be handled by the server 4 of FIG. 1A.

The parser 11 communicates to search engine 14, the relevant data fields and outcome which may be as keywords or whatever appropriate parameters are required by search engine 14. Search engines have the ability to parse inputs by keywords, or appropriate parameters for matching with web pages that are identified by web crawlers or spiders. Search engines scan millions of web pages per hour, forming indices of keywords or appropriate parameters, numbers, images, and associated URLs and identifiers for display.

When a search is performed, keywords or appropriate parameters, from a parsed query are matched to keywords or appropriate parameters, in search engine indices and URLs associated with relevant websites are identified. In the prior art these are ranked for relevance and presented to a user in a video display.

System policies could be established to favor websites having a reputation for reliable data and disfavoring websites having a reputation for unreliable data. Unreliable data would have low ranking among relevant websites and websites having reliable data would have high ranking.

System policies must select either a single website containing relevant data if no comparative analysis is desired or a plurality of websites if comparative analysis is desired.

Once the outcome is confirmed by the parser 11, the web search is focused on URLs that have data pertaining to the keywords or appropriate parameters related to the data fields and outcome. Methods involve use of operators that manipulate field data in the data fields. Focused searching is known. In block 15, websites with mineable data are selected. The websites or URLs are arranged by scores according to collectible mineable data content that meets a specification for determining the outcome.

Alternatively, some needed field data may not be present for data fields that may be of interest to a user on any websites. In this situation field data for these data fields must be manually entered into the cells and operators adjusted to take these data fields into account. The outcome may be one of several similar results all having common components.

The field data in the data fields must be extractable to achieve a good ranking in two types of websites found by the search engine 2 of FIG. 1A. As shown in block 16, mineable data is assigned to the data fields. Data mining may be tested by extracting relevant data that is normalized in common units, such as currency units, weight or distance units, color shades, airport codes, etc. and then stored in the data fields. Operators may then apply logical or arithmetic processes. An available calculator or a spreadsheet macro procedure could determine relevant data fields. Data fields used by a calculator or operator would be matched to data fields that are storing field data in order to calculate a desired outcome.

As shown in block 17, the decision matrix is constructed as a second user display and presented to the user 1 of FIG. 1A. The second user display, as the first user display, is a graphical representation appearing on the display device (not shown) with which user 1 may interact. Field data from the various sites are transferred to a decision matrix which is displayed to the user 1 of FIG. 1A. The decision matrix has rows and columns, using a spreadsheet format. In a situation where a plurality of websites are selected the decision matrix would have "n" rows where "n" was the number of relevant parameters of interest plus one row for the outcome and "m" columns where "m" was the number of selected websites. Preferably, the rows have field data from a website that respond to the user query, for example car loan data. The rows have field labels, such as loan amount, duration, interest rate, etc. At the bottom of each column is an outcome block reflecting the result of a calculator operating on the data fields. Note that a cell of the decision matrix may be populated with a single item of field data or outcome or multiple items of field data or outcomes.

Figure 2:
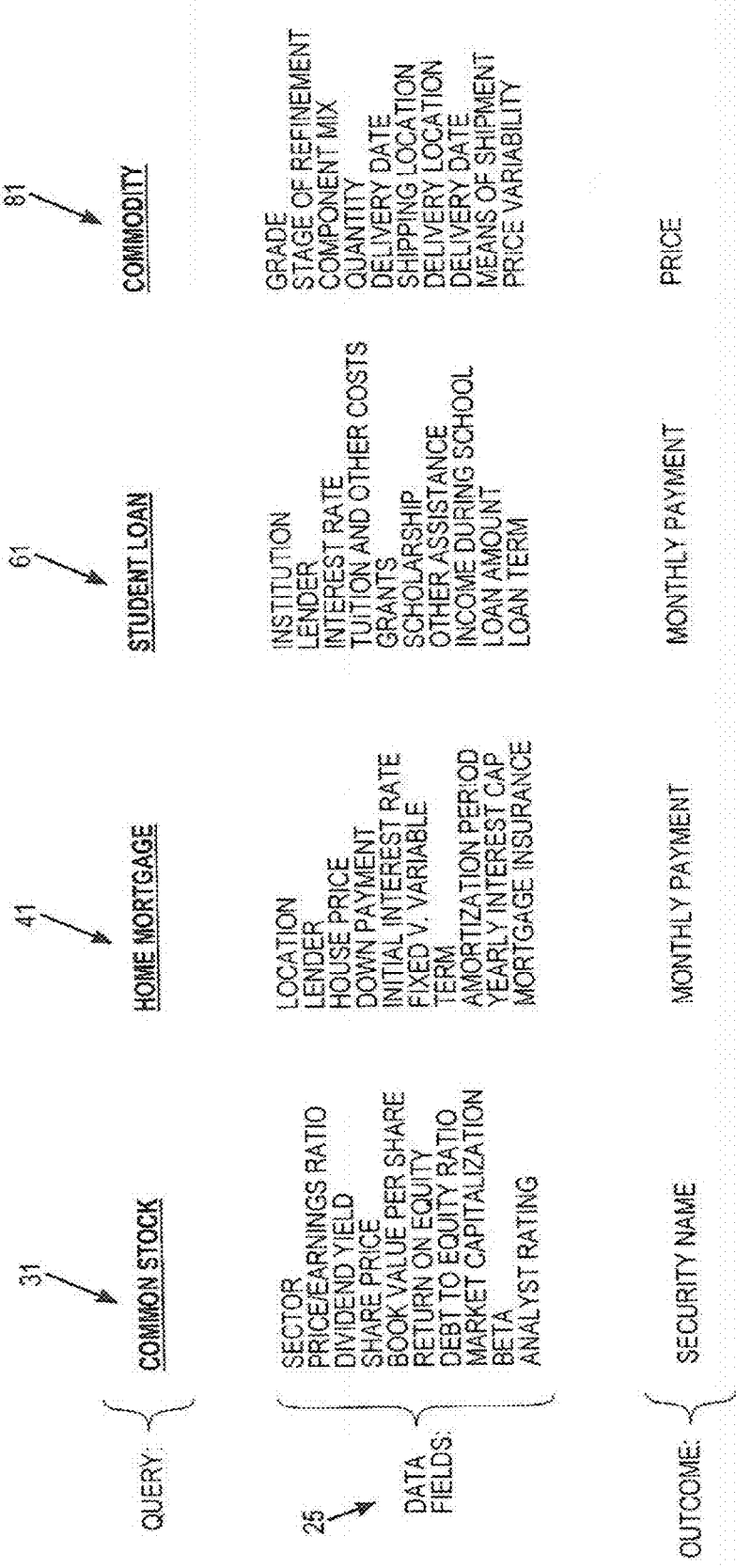
FIG. 2 is a diagram showing representative data fields for frequent search engine queries for the method of FIG. 1B.

In block 18, user 1 of FIG. 1A may interactively use the decision matrix. User 1 may interactively change field data in the cells of the various columns to model hypothetical changes in the field data that might occur in various situations. User 1 may also interactively change the outcome appearing in the outcome cell. With reference to FIG. 2, some examples of commonly-requested analyses are shown. The columns show the type of query. The rows show typical data fields with an outcome at the bottom. Because these queries are frequent, data fields are known and may be stored for immediate access.

In regard to column 31, a person might query a search engine with regard to data regarding a stock or security. Suppose a user wants general information regarding a particular stock or security. This is determined to be the outcome. Search engines can go to websites and mine data for particular data fields. The data fields 25 are shown as a group for use in a decision matrix. Different websites may produce different data in the data fields although, in principle, the data should be the same. In any event, different rows can show any differences in data from various sources on the web, or a single row can be used where data comes from a single source or is combined from more than one source. The outcome is a stock or security that matches the data field inputs found in the cells. In this case, the outcome logic operator is an exact match, or perhaps a proximity match, for the data fields. A user can then interact with the decision matrix having field data and adjust field data items in the cells, or may adjust the outcome to change the name of the security to see how the data fields change.

With reference to FIG. 3, a user input display screen 22 is shown with a query block 24. A user has typed the query "I am interested in American stocks." The query is parsed and appropriate keywords or appropriate parameters are communicated to search engine 2 of FIG. 1A. Search engine 2 retrieves information from a network, known as a web 3 of FIG. 1A.

In FIG. 4, a non site comparative decision matrix is shown that is responsive to the query of FIG. 3. Data fields are the columns whose labels are shown in row 26. These data fields may come from storage or may be selected from association with data from search engines that respond to the query of FIG. 2. Note that field data in the cells of a row may be from one or more sources. Also, data fields may be informational data fields, which do not enter into calculations. An informational, data field may be, for example, car color which would not affect the cost of a car, a monetary penalty for late payment of a loan, etc. At the end of row 26 is outcome cell 28 which is the name or code for a security of interest. Since the query of FIG. 1B did not identify any particular U.S. security potentially all. U.S. securities have data responsive to the query and so the decision matrix cannot be completed without further interactive input. A message to the user would call for further specification of the query.

A user can start to insert field data in the cells corresponding to the data fields to narrow possible outcomes, or can specify the outcome and then inspect corresponding data fields. The field data in the cells can be changed to see how the outcome changes or the outcome can be changed to see how the data fields change. In either case, further information is supplied by a user so that the decision matrix can be populated with an outcome and field data that relates to the outcome. Where the query relates to a single stock, that stock is the outcome and corresponding field data is posted to cells that correspond to the data fields that characterize that stock. The user may use additional rows to enter different field data in the cells to see a different outcome.

Returning to FIG. 2, in column 41, the subject is home mortgages and the desired outcome is a monthly payment. In this case, a search engine can go to websites of different lenders where the information in the data fields would show differences in interest rate, mortgage insurance, and perhaps other data field items. In the case of stocks of column 31 and in the application of the stocks in FIG. 4, the security name could be specified as the outcome, or corresponding field data could indicate a stock. However, in the home mortgage example of column 41, the monthly payment is calculated using operators and a calculator which are associated with the particular query. A number of calculators and logic operators may be stored in storage 5 of FIG. 1A for use with frequent queries. It is necessary that data fields found and used by a calculator include the relevant data fields needed for a calculation, or most of them, associated with the home mortgage query.

In column 61, data fields 25 are identified with another loan calculation. Websites of the first type are searched for student loan information and websites are identified having mineable data. Such mineable data is stored in data fields associated with selected websites. A calculator is found in storage 5 of FIG. 1A dealing with the data fields and then operates on field data within the cells to calculate a monthly payment outcome. A user may interactively change field data in any of the cells to see how the monthly payment outcome is varied. Correspondingly, the user may interactively change the monthly payment outcome to see how data in the cells would change.

In column 81 data fields associated with a particular commodity are listed. The data fields associated with the commodity are listed. In a first search, websites are identified having mineable data relating to the data fields. The mineable data is extracted and stored in the data fields so that a price calculator may operate on the field data and calculate a price outcome.

Figure 5:
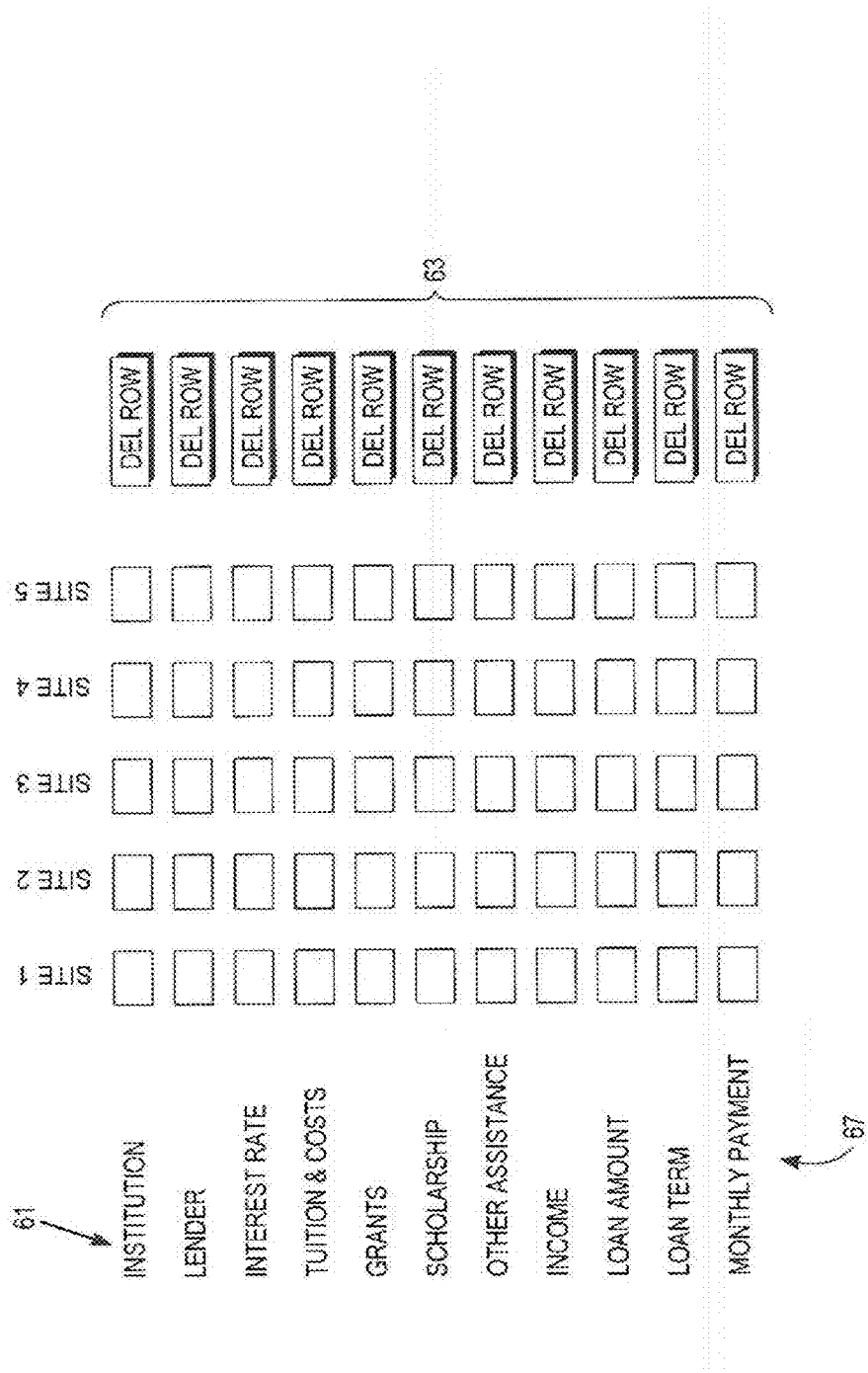
FIG. 5 is a diagram of a decision matrix, a site comparative analysis decision matrix, using student loan data fields shown in FIG. 2 that allows comparison of loans from different sites.

FIG. 5 illustrates a decision matrix, a site comparative analysis decision matrix, which has formed from the data fields of the student loan column data fields 61 identified in FIG. 2. Five websites with student loan information are selected based upon having mineable data associated with data fields 61 allowing for a comparative analysis of the loan conditions offered by the five websites. Note that most of the information in column 61 would be supplied by a user, while only a small amount of data such as lender interest rate and loan term would be found in the website. In this situation, a user would have the option to delete non-relevant rows indicated by the delete row buttons 63 appearing on the user display or, alternatively, could enter information manually.

The data field of row may be an informational data field may be, for example, a car color which would not affect the cost of a car, a monetary penalty for late payment of a loan, etc.

A calculator is devised or retrieved from storage 5 of FIG. 1A and embedded in the decision matrix to manipulate information in the data fields from different websites to find an outcome in the monthly payment line 67. Different monthly payments would be computed based on differences on interest rate and loan term. A user could insert additional data fields to take into account other sources of income, such as different jobs or to separate items such as tuition and costs. A user could interactively manipulate the field data in the cells to test hypothetical situations. The operators of the decision matrix are expressed as calculator macros for each column which also allow a user to change an outcome, in this illustration the monthly payment, to see how the field data in the cells would change.

What is claimed is:

1. A computer implemented, web-based, decision matrix display method using search engines comprising:
   entering a data query into a first user display;
   parsing the data query to identify relevant data fields and stored operators which are pertinent to computing a desired outcome to the data query;
   communicating the relevant data fields to a search engine;

selecting websites, located by the search engine, which have mineable data pertinent to the relevant data fields and the desired outcome of the data query;

assigning the mineable data from the selected websites to the relevant data fields as field data;

displaying onto a second user display, a decision matrix, populated with cells corresponding to the relevant data fields containing the field data and a cell for the corresponding desired outcome;

providing the relevant stored operators to the decision matrix; and interacting with the decision matrix to obtain desired decision information by engaging in at least one of:

(a) interactively changing the field data in one or more cells of the decision matrix and displaying on the decision matrix the field data in the cells, whether changed or unchanged, and by use of the relevant stored operators, determining and displaying the corresponding desired outcome, wherein when interactively changing field data in one or more cells of the decision matrix, a user designates which other cells of the decision matrix are to remain unchanged and designates whether the desired outcome is to remain unchanged, all other cells not designated by the user being changeable as a result of interactively changing the field data; and (b) interactively changing the desired outcome on the decision matrix and displaying on the decision matrix the changed desired outcome and, by use of the relevant stored operators, determining and displaying the field data in the cells whether changed or unchanged.

2. The method of claim 1 further defined by using a spreadsheet as the decision matrix with the relevant stored operators embedded in the spreadsheet.

3. The method of claim 1 wherein parsing the data query includes requesting feedback pertaining to the data query.

4. The method of claim 1 wherein parsing the data query includes establishing data fields and the relevant stored operators for data queries that have not been previously identified.

5. The method of claim 1 wherein the selected websites are ranked according to reliability of the mineable data.

6. The method of claim 5 wherein the mineable data assigned to the relevant data fields are selected from high ranked websites.

7. The method of claim 1 wherein the mineable data assigned to the relevant data fields are normalized in common units.

8. The method of claim 1 further comprising manual insertion of field data or desired outcome into empty cells of the decision matrix.

9. The method of claim 1 wherein interactively changing the field data or the desired outcome in the cells is done manually.

10. The method of claim 1 wherein the relevant stored operators comprise arithmetic operators or logical operators.

11. The method of claim 1 wherein population of the cell comprises populating the cell with one or more items of field data or one or more desired outcomes.

12. The method of claim 1 wherein further comprising designating certain cells whose field data remains unchanged when interactively changing the desired outcome, a user designates cells of the decision matrix whose field data is to remain unchanged, the field data in all other cells being changeable as a result of interactively changing the desired outcome.

13. The method of claim 1 wherein the decision matrix is a site comparative analysis decision matrix where the field data of the relevant data fields and the desired outcomes are arranged for each selected website of a plurality of selected websites.

14. The method of claim 1 wherein the decision matrix is a non site comparative decision matrix where the field data of the relevant data fields and desired outcome are selected from one or more websites to produce the desired outcome arranged in the cells of the decision matrix without regard for data source.

* * * * *